(12) United States Patent
Shi et al.

(10) Patent No.: US 12,068,977 B2
(45) Date of Patent: *Aug. 20, 2024

(54) DATA MIGRATION METHOD AND APPARATUS

(71) Applicant: Huawei Technologies Co., Ltd., Shenzhen (CN)

(72) Inventors: Xiaoyan Shi, Shenzhen (CN); Qianghua Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,190

(22) Filed: Feb. 22, 2022

(65) Prior Publication Data

US 2022/0182337 A1 Jun. 9, 2022

Related U.S. Application Data

(63) Continuation of application No. 16/414,413, filed on May 16, 2019, now Pat. No. 11,283,730, which is a
(Continued)

(51) Int. Cl.
*H04L 49/25* (2022.01)
*H04L 45/74* (2022.01)
(Continued)

(52) U.S. Cl.
CPC ............ *H04L 49/25* (2013.01); *H04L 45/74* (2013.01); *H04L 49/351* (2013.01);
(Continued)

(58) Field of Classification Search
CPC ... H04L 2101/622; H04L 45/74; H04L 49/25; H04L 49/351; H04L 61/103;
(Continued)

(56) References Cited

U.S. PATENT DOCUMENTS 8,873,510 B2 * 10/2014 Yuan ................. H04W 36/0022
370/331
8,948,032 B1 * 2/2015 Sampath ................. H04L 45/68
370/252
(Continued)

FOREIGN PATENT DOCUMENTS

CN 101072425 A 11/2007
CN 101754305 A 6/2010
(Continued)

OTHER PUBLICATIONS

U.S. Appl. No. 62/412,802 (Year: 2019).*
(Continued)

*Primary Examiner* — Dung B Huynh
(74) *Attorney, Agent, or Firm* — Conley Rose, P.C.

(57) ABSTRACT

A data migration method and an apparatus are applied to a scenario in which a user plane gateway communicating with a terminal is changed from a source user plane gateway to a target user plane gateway. The target user plane gateway receives an address of the terminal from a control plane gateway, obtains an Ethernet data packet based on the address of the terminal, and sends the Ethernet data packet to an Ethernet interface, so that a switch obtains the Ethernet data packet through the Ethernet interface, and updates a MAC address table based on the Ethernet data packet.

20 Claims, 10 Drawing Sheets

Related U.S. Application Data continuation of application No. PCT/CN2016/106060, filed on Nov. 16, 2016.

(51) Int. Cl.
  *H04L 49/351* (2022.01)
  *H04L 61/103* (2022.01)
  *H04W 36/10* (2009.01)
  *H04W 36/12* (2009.01)
  *H04L 101/622* (2022.01)

(52) U.S. Cl.
  CPC ........... *H04L 61/103* (2013.01); *H04W 36/10* (2013.01); *H04W 36/12* (2013.01); *H04L 2101/622* (2022.05)

(58) Field of Classification Search
  CPC ..... H04W 36/10; H04W 36/12; H04W 36/18; H04W 8/26; H04W 88/14; H04W 88/16
  See application file for complete search history.

(56) References Cited

U.S. PATENT DOCUMENTS

| | | | |
|---|---|---|---|
| 9,019,973 B1* | 4/2015 | Shukla | H04L 45/66 370/395.31 |
| 9,072,009 B1* | 6/2015 | Wurtenberger | H04W 72/51 |
| 9,467,938 B1* | 10/2016 | Srinivas | H04W 48/20 |
| 9,575,918 B2* | 2/2017 | Evans | G06F 13/36 |
| 9,608,715 B1 | 3/2017 | Fang | |
| 9,667,485 B2 | 5/2017 | Murphy | H04L 41/0886 |
| 9,813,939 B1* | 11/2017 | Marupaduga | H04W 28/0205 |
| 10,681,619 B2* | 6/2020 | Zhou | H04L 61/103 |
| 11,159,579 B2 | 10/2021 | Pentakota | |
| 11,895,197 B2* | 2/2024 | Zhu | H04L 69/22 |
| 2002/0136226 A1 | 9/2002 | Christoffel et al. | |
| 2003/0133422 A1 | 7/2003 | Bims | |
| 2003/0227893 A1* | 12/2003 | Bajic | H04L 49/70 370/469 |
| 2004/0064581 A1* | 4/2004 | Shitama | H04W 36/18 709/218 |
| 2004/0097232 A1* | 5/2004 | Haverinen | H04L 63/162 455/436 |
| 2005/0041587 A1* | 2/2005 | Lee | H04L 45/00 370/359 |
| 2005/0250499 A1 | 11/2005 | Lee et al. | |
| 2005/0255847 A1 | 11/2005 | Han et al. | |
| 2005/0265329 A1* | 12/2005 | Havala | H04L 45/50 370/389 |
| 2006/0159049 A1 | 7/2006 | Chung | |
| 2006/0227746 A1* | 10/2006 | Kim | H04W 36/005 370/331 |
| 2006/0256749 A1* | 11/2006 | Rexhepi | H04W 8/26 370/329 |
| 2006/0268765 A1 | 11/2006 | Bajic et al. | |
| 2007/0097919 A1 | 5/2007 | Tsubota | |
| 2007/0165648 A1 | 7/2007 | Joo | |
| 2007/0192506 A1* | 8/2007 | Gupta | H04W 40/36 709/238 |
| 2007/0248049 A1* | 10/2007 | Fajardo | H04W 36/02 370/331 |
| 2007/0249347 A1 | 10/2007 | Saifullah et al. | |
| 2007/0255834 A1 | 11/2007 | Abhishek et al. | |
| 2007/0275726 A1 | 11/2007 | Lee et al. | |
| 2007/0297362 A1 | 12/2007 | Kimura et al. | |
| 2008/0002625 A1 | 1/2008 | Cho et al. | |
| 2008/0031185 A1* | 2/2008 | Bims | H04W 12/08 370/328 |
| 2008/0108326 A1 | 5/2008 | Park et al. | |
| 2008/0123604 A1 | 5/2008 | Shimizu | |
| 2008/0130572 A1* | 6/2008 | Zhang | H04W 36/18 370/331 |
| 2008/0146230 A1 | 6/2008 | Pandian et al. | |
| 2008/0159230 A1 | 7/2008 | Cho et al. | |
| 2008/0170546 A1 | 7/2008 | Kitamura | |
| 2008/0192696 A1* | 8/2008 | Sachs | H04W 36/02 370/331 |
| 2008/0205345 A1 | 8/2008 | Sachs et al. | |
| 2008/0311911 A1 | 12/2008 | Koodi et al. | |
| 2009/0023453 A1* | 1/2009 | Hu | H04L 12/189 455/452.1 |
| 2009/0059876 A1* | 3/2009 | Kim | H04L 49/309 370/331 |
| 2009/0061876 A1 | 3/2009 | Ho et al. | |
| 2009/0116454 A1* | 5/2009 | Kanazawa | H04W 36/0033 370/332 |
| 2009/0129287 A1 | 5/2009 | Liang et al. | |
| 2009/0131053 A1* | 5/2009 | Sachs | H04W 36/0016 455/436 |
| 2009/0170557 A1* | 7/2009 | Chauhan | H04L 69/18 455/552.1 |
| 2009/0180478 A1* | 7/2009 | Yu | H04L 12/4633 370/395.62 |
| 2009/0219900 A1* | 9/2009 | Kokkinen | B61L 15/0027 370/338 |
| 2009/0316650 A1* | 12/2009 | Um | H04W 8/06 370/331 |
| 2010/0118830 A1 | 5/2010 | Stephenson et al. | |
| 2010/0144353 A1 | 6/2010 | Chong et al. | |
| 2010/0157963 A1 | 6/2010 | Choi et al. | |
| 2011/0004913 A1* | 1/2011 | Nagarajan | H04L 63/102 726/1 |
| 2011/0281581 A1 | 11/2011 | Brandt et al. | |
| 2011/0299538 A1* | 12/2011 | Maruta | H04L 12/4641 370/392 |
| 2011/0317664 A1* | 12/2011 | Schlenk | H04W 40/36 370/331 |
| 2012/0039323 A1* | 2/2012 | Hirano | H04W 76/12 370/338 |
| 2012/0106514 A1 | 5/2012 | Zheng et al. | |
| 2012/0225655 A1 | 9/2012 | Son et al. | |
| 2012/0314689 A1 | 12/2012 | Wang | |
| 2013/0034057 A1* | 2/2013 | Aramoto | H04W 36/0011 370/328 |
| 2013/0039658 A1* | 2/2013 | Abbas | H04J 3/1652 398/52 |
| 2013/0054761 A1 | 2/2013 | Kempf et al. | |
| 2013/0155846 A1* | 6/2013 | Ramachandran | H04L 12/4641 370/242 |
| 2013/0170435 A1 | 7/2013 | Dinan | |
| 2013/0205043 A1 | 8/2013 | Lu et al. | |
| 2013/0279507 A1* | 10/2013 | Miyabe | H04L 43/0852 370/392 |
| 2013/0305332 A1* | 11/2013 | Narasimhan | H04W 36/0038 726/7 |
| 2014/0059192 A1* | 2/2014 | Miklos | H04L 61/255 709/221 |
| 2014/0071925 A1 | 3/2014 | Liu | |
| 2014/0086211 A1 | 3/2014 | Liu | |
| 2014/0086226 A1 | 3/2014 | Zhao et al. | |
| 2014/0112338 A1* | 4/2014 | Huang | G06F 13/385 370/389 |
| 2014/0112349 A1* | 4/2014 | Moreno | H04L 45/64 370/400 |
| 2014/0169377 A1* | 6/2014 | Shuai | H04L 45/7452 370/392 |
| 2014/0178073 A1* | 6/2014 | Katagiri | H04J 3/1664 398/66 |
| 2014/0211714 A1 | 7/2014 | Li et al. | |
| 2014/0226665 A1* | 8/2014 | Ido | H04L 45/745 370/392 |
| 2014/0269535 A1 | 9/2014 | Pazhyannur et al. | |
| 2014/0328254 A1 | 11/2014 | Lim | |
| 2014/0376511 A1 | 12/2014 | Kalapatapu et al. | |
| 2015/0016340 A1 | 1/2015 | Itoh et al. | |
| 2015/0029862 A1* | 1/2015 | Olenz | H04L 47/30 370/236 |
| 2015/0085845 A1* | 3/2015 | Wang | H04W 76/14 370/338 |
| 2015/0103665 A1 | 4/2015 | Kaippallimalil et al. | |

(56) References Cited

U.S. PATENT DOCUMENTS

| | | | |
|---|---|---|---|
| 2015/0124812 A1* | 5/2015 | Agarwal | H04L 45/24 370/392 |
| 2015/0141015 A1 | 5/2015 | Zhang et al. | |
| 2015/0207872 A1* | 7/2015 | Stiemerling | H04L 67/568 709/219 |
| 2015/0208321 A1* | 7/2015 | Sane | H04W 28/0226 370/328 |
| 2015/0215918 A1* | 7/2015 | Wu | H04W 72/23 370/329 |
| 2015/0282026 A1* | 10/2015 | Gupta | H04B 7/0632 370/331 |
| 2015/0372929 A1* | 12/2015 | Rochwerger | H04L 47/24 709/238 |
| 2016/0014127 A1* | 1/2016 | Mohebbi | H04W 48/18 455/411 |
| 2016/0065298 A1* | 3/2016 | Nakagawa | H04B 7/15528 370/315 |
| 2016/0192266 A1 | 6/2016 | Dai et al. | |
| 2016/0212666 A1 | 7/2016 | Zalzalah et al. | |
| 2016/0219479 A1 | 7/2016 | Wei | |
| 2016/0261490 A1 | 9/2016 | Evans | |
| 2016/0262066 A1 | 9/2016 | Ozturk et al. | |
| 2016/0277976 A1 | 9/2016 | Takahashi et al. | |
| 2016/0286443 A1 | 9/2016 | Tian | |
| 2016/0309397 A1* | 10/2016 | Zhou | H04L 61/103 |
| 2016/0330077 A1 | 11/2016 | Jin et al. | |
| 2016/0338128 A1 | 11/2016 | De Silva et al. | |
| 2017/0013512 A1 | 1/2017 | Bi et al. | |
| 2017/0041227 A1* | 2/2017 | Zhou | H04W 40/02 |
| 2017/0055313 A1 | 2/2017 | Sharma et al. | |
| 2017/0064585 A1 | 3/2017 | Kim et al. | |
| 2017/0127330 A1 | 5/2017 | Payyappilly et al. | |
| 2017/0230891 A1 | 8/2017 | Fang | |
| 2017/0237783 A1 | 8/2017 | Yang et al. | |
| 2017/0238362 A1* | 8/2017 | Karandikar | H04W 88/16 370/328 |
| 2017/0245310 A1* | 8/2017 | Chandramouli | H04W 8/06 |
| 2017/0251405 A1* | 8/2017 | Stojanovski | H04W 8/082 |
| 2017/0257906 A1 | 9/2017 | Gupta et al. | |
| 2017/0231020 A1 | 10/2017 | Tomici et al. | |
| 2017/0288948 A1* | 10/2017 | Singh | H04L 45/66 |
| 2017/0289019 A1 | 10/2017 | Faccin et al. | |
| 2017/0290082 A1* | 10/2017 | Salkintzis | H04W 36/0011 |
| 2018/0013788 A1 | 1/2018 | Vissamsetty et al. | |
| 2018/0035339 A1 | 2/2018 | Mitsui et al. | |
| 2018/0041930 A1 | 2/2018 | Hampel et al. | |
| 2018/0097657 A1 | 4/2018 | Dao et al. | |
| 2018/0145982 A1* | 5/2018 | Wang | H04W 88/16 |
| 2018/0192331 A1 | 7/2018 | Masini et al. | |
| 2018/0242205 A1 | 8/2018 | Mildh et al. | |
| 2018/0254919 A1 | 9/2018 | Van De Velde et al. | |
| 2018/0288670 A1 | 10/2018 | Li et al. | |
| 2018/0324138 A1* | 11/2018 | Das | H04W 36/0055 |
| 2019/0014550 A1* | 1/2019 | Rommer | H04L 41/12 |
| 2019/0045402 A1 | 2/2019 | Nagasaka et al. | |
| 2019/0116483 A1* | 4/2019 | Ryu | H04W 12/06 |
| 2019/0215691 A1* | 7/2019 | Salkintzis | H04W 12/069 |
| 2019/0273697 A1 | 9/2019 | Shi et al. | |
| 2019/0274076 A1* | 9/2019 | Kim | H04W 48/10 |
| 2020/0221360 A1* | 7/2020 | Vikberg | H04L 5/0035 |
| 2020/0267753 A1 | 8/2020 | Adjakple et al. | |
| 2020/0374689 A1* | 11/2020 | Shi | H04L 61/00 |
| 2021/0019276 A1* | 1/2021 | Meiri | G06F 13/1668 |
| 2021/0203762 A1* | 7/2021 | Liu | H04L 12/4641 |
| 2021/0219110 A1* | 7/2021 | Kousaridas | H04W 4/70 |
| 2021/0306887 A1 | 9/2021 | Kim et al. | |
| 2021/0336811 A1* | 10/2021 | Mishra | H04L 45/50 |
| 2022/0078631 A1* | 3/2022 | Salahuddeen | H04L 45/16 |
| 2022/0182337 A1* | 6/2022 | Shi | H04W 36/12 |
| 2022/0210647 A1* | 6/2022 | Centonza | H04L 63/0236 |
| 2022/0256510 A1* | 8/2022 | Goldhamer | H04W 16/14 |
| 2022/0345881 A1* | 10/2022 | Tan | H04L 61/5007 |
| 2022/0400424 A1* | 12/2022 | Ghadge | H04L 45/74 |
| 2022/0417855 A1* | 12/2022 | Shukla | H04W 52/46 |
| 2023/0033048 A1* | 2/2023 | Joshi | H04L 61/4552 |
| 2023/0074963 A1* | 3/2023 | Saye | H04L 61/103 |
| 2023/0155762 A1* | 5/2023 | Zhang | H04L 5/0064 370/433 |
| 2023/0336467 A1* | 10/2023 | Padebettu | H04L 45/42 |

FOREIGN PATENT DOCUMENTS

| | | |
|---|---|---|
| CN | 103141133 A | 6/2013 |
| CN | 103686888 A | 3/2014 |
| CN | 103931149 A | 7/2014 |
| CN | 105282803 A | 1/2016 |
| CN | 109417741 B | 1/2021 |
| EP | 2166735 A1 | 3/2010 |
| WO | 2010063175 A1 | 6/2010 |
| WO | 2015120685 A1 | 8/2015 |

OTHER PUBLICATIONS

LG Electronics, Solution update of UP protocol model—Per Node-level Tunnel. SA WG2 Meeting #117, Oct. 17-21, 2016, Kaohsiung, Taiwan, S2-165751, 4 pages.

"3rd Generation Partnership Project; Technical Specification Group Services and System Aspects; Study on Architecture for Next Generation System (Release 14)," 3GPP TR 23.799, V1.1.0, Part 1, Oct. 2016, 167 pages.

"3rd Generation Partnership Project; Technical Specification Group Services and System Aspects; Study on Architecture for Next Generation System (Release 14)," 3GPP TR 23.799, V1.1.0, Part 2, Oct. 2016, 167 pages.

"3rd Generation Partnership Project; Technical Specification Group Services and System Aspects; Study on Architecture for Next Generation System (Release 14)," 3GPP TR 23.799, V1.1.0, Part 3, Oct. 2016, 169 pages.

3GPP TS 23.401 V14.1.0, "3rd Generation Partnership Project; Technical Specification Group Services and System Aspects; General Packet Radio Service (GPRS) enhancements for Evolved Universal Terrestrial Radio Access Network (E-UTRAN) access," Sep. 2016, 378 pages.

* cited by examiner

DATA MIGRATION METHOD AND APPARATUS

CROSS-REFERENCE TO RELATED APPLICATIONS

This application is a continuation of U.S. patent application Ser. No. 16/414,413, filed on May 16, 2019, now U.S. Pat. No. 11,283,730, which is a continuation of International Patent Application No. PCT/CN2016/106060 filed on Nov. 16, 2016. All of the aforementioned patent applications are hereby incorporated by reference in their entireties.

TECHNICAL FIELD

Embodiments of the present application relate to the field of communications technologies, and in particular, to a data migration method and an apparatus.

BACKGROUND

In processes in which a terminal sends and receives Ethernet-type data using a mobile network such as $4^{th}$ Generation (4G) or $5^{th}$ Generation (5G), the data needs to be received and forwarded using a corresponding Ethernet switch. As shown in FIG. 1A, the Ethernet switch is a switch that transmits data based on an Ethernet address. Each port of the Ethernet switch is directly connected to a host, and the Ethernet switch usually operates in a full-duplex mode. The switch can connect many pairs of ports at the same time, such that each pair of hosts that communicate with each other can perform conflict-free data transmission in a manner like that of exclusively occupying a communications medium.

When receiving an Ethernet frame that needs to be forwarded, the Ethernet switch searches a Media Access Control (MAC) address table based on a destination MAC address in a frame header of the Ethernet frame, to obtain a port that corresponds to the destination MAC address and that is on the Ethernet switch, and then forwards the Ethernet frame through the port, in order to implement data exchange. If the destination MAC address is not in the MAC address table, the Ethernet switch "floods" the Ethernet frame to all ports. When a port for communication between a receive end and the Ethernet switch changes, the Ethernet switch updates the MAC address list using an Address Resolution Protocol (ARP) Ethernet frame or a null data packet (NDP) Ethernet frame.

When the terminal and an evolved packet system (EPS) establish a session connection supporting an Ethernet-type packet data network (PDN), after the terminal is attached to the EPS, the terminal sends an Ethernet frame using a general packet radio service (GPRS) tunneling protocol (GTP) tunnel of the EPS, a user plane (UP) gateway (GW) sends the Ethernet frame to an SGi interface, and the Ethernet switch obtains the Ethernet frame from the SGi interface. However, when the terminal moves, the EPS possibly switches the user plane gateway performing a session with the terminal. In this case, because the address list of the Ethernet switch is not updated in a timely manner, the Ethernet switch still continues to forward, to a source UP GW in a short time, a downlink Ethernet frame to be sent to the terminal. Consequently, a target UP GW serving the terminal cannot obtain the downlink Ethernet frame to be sent to the terminal, resulting in a data loss.

SUMMARY

The present application provides a data migration method and an apparatus, to overcome a data loss problem caused in a migration process of an Ethernet-type data connection in related approaches.

According to a first aspect, a data migration method is provided. When a control plane gateway switches a user plane gateway communicating with a terminal from a source user plane gateway to a target user plane gateway, the method includes: receiving, by the target user plane gateway, an address of the terminal that is sent by the control plane gateway; obtaining, by the target user plane gateway, an Ethernet data packet based on the address of the terminal, where the Ethernet data packet includes uplink data sent by the terminal or an ARP packet; and sending, by the target user plane gateway, the Ethernet data packet to an Ethernet interface, such that a switch obtains the Ethernet data packet through the Ethernet interface, and updates a MAC address table based on the Ethernet data packet.

In this way, the switch can obtain the ARP packet or the uplink data through the Ethernet interface, update the MAC address table based on the ARP packet or the uplink data, and change a port for sending data to the terminal, to avoid a loss of downlink data to be sent to the terminal.

In a possible design, the method further includes: obtaining, by the target user plane gateway using a unidirectional transmission channel, first downlink data sent by the source user plane gateway, where the unidirectional transmission channel is a unidirectional temporary transmission tunnel established between the source user plane gateway and the target user plane gateway; and sending, by the target user plane gateway, the first downlink data to the terminal based on the address of the terminal.

In this way, a problem can be avoided such as a loss or a sending latency of the downlink data to be sent to the terminal that is caused because the MAC address table in the switch fails to be updated in a timely manner.

In a possible design, the method further includes: obtaining, by the target user plane gateway through the Ethernet interface, second downlink data to be sent to the terminal, where the second downlink data carries an address of the terminal; and releasing, by the target user plane gateway, the unidirectional transmission channel if the address of the terminal that is carried in the second downlink data successfully matches the address of the terminal that is sent by the control plane gateway.

When the address of the terminal that is carried in the second downlink data matches the address of the terminal that is sent by the control plane gateway, it may be determined that the MAC address table in the switch has been updated. In this case, the target user plane gateway may release the transmission channel between the source user plane gateway and the target user plane gateway.

In a possible design, the address of the terminal includes at least one of an internet protocol (IP) address of the terminal or a MAC address of the terminal.

In a possible design, obtaining, by the target user plane gateway, an Ethernet data packet based on the address of the terminal includes: receiving, by the target user plane gateway, an ARP packet sent by the terminal that includes the address of the terminal; or generating, by the target user plane gateway, an ARP packet including the address of the terminal.

In a possible design, the address of the terminal is the IP address, and obtaining, by the target user plane gateway based on the address of the terminal, an ARP packet sent by the terminal includes: sending, by the target user plane gateway, an ARP request message to the terminal, where the ARP request message includes the IP address of the terminal and a source MAC address, and where the source MAC address is a broadcast MAC address; and receiving, by the target user plane gateway, the ARP packet sent by the terminal, where the ARP packet carries a destination MAC address of the terminal, and where the destination MAC address is the source MAC address included in the ARP request message.

In a possible design, obtaining, by the target user plane gateway based on the address of the terminal, an ARP packet sent by the terminal includes: receiving, by the target user plane gateway, a gratuitous ARP packet sent by the terminal, where if the gratuitous ARP packet carries the address of the terminal, the gratuitous APR packet is the ARP packet sent by the terminal.

In a possible design, the target user plane gateway is located in an evolved packet system (EPS), and the Ethernet interface is an SGi interface. Alternatively, the target user plane gateway is located in a next generation NexGen system, and the Ethernet interface is an NG6 interface.

According to a second aspect, a data migration method is further provided. The method includes: obtaining, by a control plane gateway, a MAC address of a terminal; and sending, by the control plane gateway, the MAC address of the terminal to the target user plane gateway.

According to a third aspect, a user plane gateway is provided, and is applied to a scenario in which a user plane gateway communicating with a terminal is changed from a source user plane gateway to the user plane gateway, and the user plane gateway includes: a receiving unit configured to receive an address of the terminal that is sent by a control plane gateway; a processing unit configured to obtain an Ethernet data packet based on the address of the terminal that is received by the receiving unit, where the Ethernet data packet includes uplink data sent by the terminal or an ARP packet; and a sending unit configured to send the Ethernet data packet obtained by the processing unit to an Ethernet interface, such that a switch obtains the Ethernet data packet through the Ethernet interface, and updates a MAC address table based on the Ethernet data packet.

In a possible design, the receiving unit is further configured to obtain, using a unidirectional transmission channel, first downlink data sent by the source user plane gateway, where the unidirectional transmission channel is a unidirectional temporary transmission tunnel established between the source user plane gateway and the user plane gateway. Additionally, the sending unit is further configured to send the first downlink data to the terminal based on the address of the terminal that is received by the receiving unit.

In a possible design, the receiving unit is further configured to obtain, through the Ethernet interface, second downlink data to be sent to the terminal, where the second downlink data carries an address of the terminal. Additionally, the processing unit is configured to release the unidirectional transmission channel if the address of the terminal that is carried in the second downlink data received by the receiving unit successfully matches the address of the terminal that is sent by the control plane gateway.

In a possible design, the address of the terminal includes at least one of an IP address of the terminal or a MAC address of the terminal.

In a possible design, the receiving unit is further configured to receive an ARP packet sent by the terminal that includes the address of the terminal. Alternatively, the processing unit is further configured to generate an ARP packet including the address of the terminal.

In a possible design, the address of the terminal is the IP address. The sending unit is further configured to send an ARP request message to the terminal, where the ARP request message includes the IP address of the terminal and a source MAC address, and where the source MAC address is a broadcast MAC address. The receiving unit is further configured to receive the ARP packet sent by the terminal, where the ARP packet carries a destination MAC address of the terminal, and where the destination MAC address is the source MAC address included in the ARP request message.

In a possible design, the receiving unit is further configured to receive a gratuitous ARP packet sent by the terminal, where if the gratuitous ARP packet carries the address of the terminal, the gratuitous APR packet is the ARP packet sent by the terminal.

In a possible design, the user plane gateway is located in an EPS, and the Ethernet interface is an SGi interface. Alternatively, the user plane gateway is located in a next generation NexGen system, and the Ethernet interface is an NG6 interface.

According to a fourth aspect, a control plane gateway is further provided. The control plane gateway includes: a processing unit configured to obtain a MAC address of a terminal; and a sending unit configured to send, to the target user plane gateway, the MAC address of the terminal that is obtained by the processing unit.

BRIEF DESCRIPTION OF DRAWINGS

The accompanying drawings herein are incorporated in the specification, become a part of the specification, show embodiments that are in accordance with the present application, and are used with the specification to explain a principle of the present application.

DESCRIPTION OF EMBODIMENTS

The following describes the embodiments of the present application with reference to the accompanying drawings.

To enhance network flexibility and scalability, function items in an evolved packet core (EPC) network are usually divided into a control plane gateway and a user plane gateway. The user plane gateway is mainly used to process a data packet. The control plane gateway is mainly used to define a processing action performed by the user plane gateway on the data packet. The control plane gateway sends a processing rule of the data packet to the user plane gateway. When the data packet arrives at the user plane gateway, the user plane gateway performs corresponding processing on the data packet according to the processing rule delivered by the control plane gateway, in order to complete processing, sending, and the like for the data packet of a terminal.

Figure 1A:
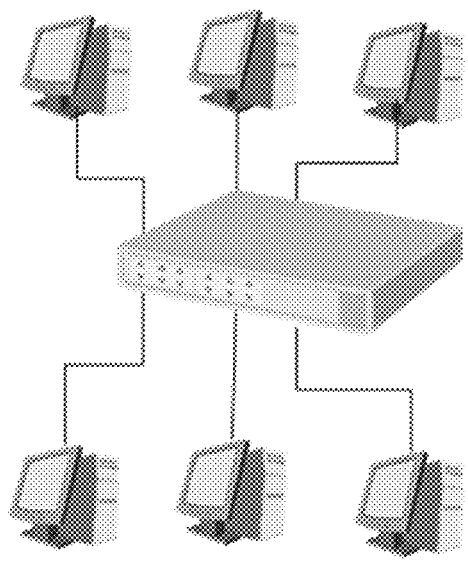
FIG. 1A is a schematic diagram of an application scenario of an Ethernet switch.
Figure 1B:
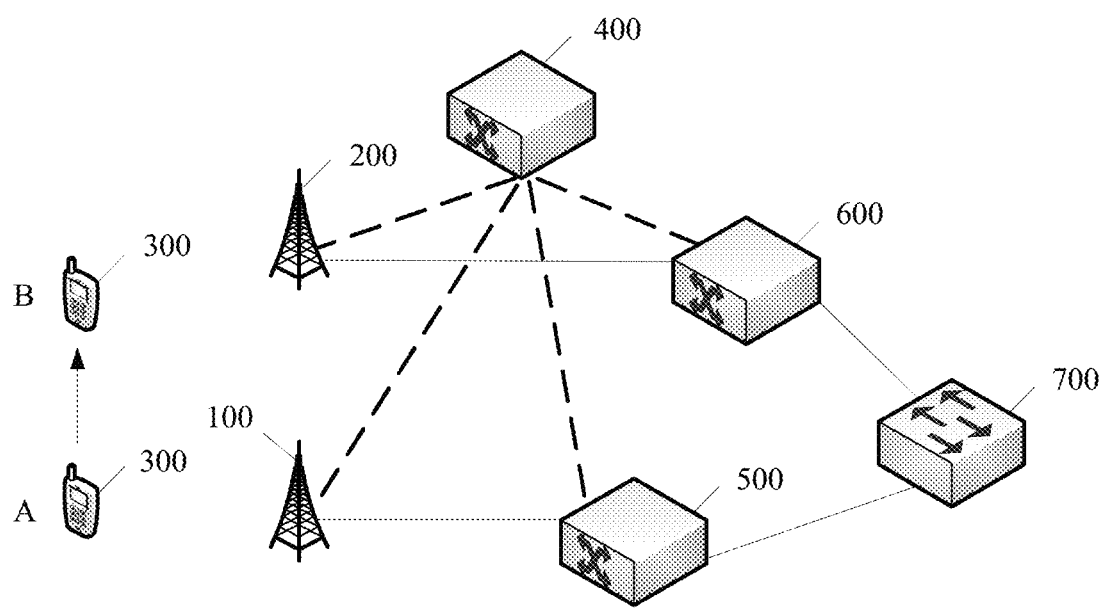
FIG. 1B is a schematic diagram of an application scenario according to an embodiment of the present application.

FIG. 1B is a schematic diagram of an application scenario according to an embodiment of the present application. As shown in FIG. 1B, when a terminal 300 is located at a location A, the terminal communicates with a base station 100, and the terminal 300 sends data to or receives data from a source user plane gateway 500 using the base station 100. The source user plane gateway 500 may send data to an Ethernet interface, or the source user plane gateway 500 obtains data sent by an Ethernet interface. Likewise, a switch 700 may obtain data from the Ethernet interface, or send data to the Ethernet interface. In other words, the source user plane gateway 500 communicates with the switch 700 through the Ethernet interface. Likewise, a target user plane gateway 600 may also communicate with the switch 700 through an Ethernet interface. For example, in an evolved packet system (EPS), the Ethernet interface is an SGi interface; or in a next generation (NexGen) system, the Ethernet interface is an NG6 interface.

When the terminal 300 moves from the location A in FIG. 1B to a location B, cell handover or cell reselection may occur. In this case, a base station communicating with the terminal 300 is changed from the base station 100 to a base station 200. To optimize a communication path between the terminal and a user plane gateway, a control plane gateway 400 switches the user plane gateway communicating with the terminal 300 from the source user plane gateway 500 to the target user plane gateway 600. However, in other approaches, in this case, because a MAC address table in the switch 700 is not updated in a timely manner, the switch 700 continues to send downlink data to the source user plane gateway based on the MAC address table that is not updated. Consequently, in this case, the target user plane gateway performing a session with the terminal 300 cannot obtain the downlink data that needs to be sent to the terminal, resulting in a data loss.

To resolve the foregoing problem in other approaches, the present application provides a data migration method and an apparatus.

With reference to FIG. 1B, when the control plane gateway 400 switches the user plane gateway communicating with the terminal 300 from the source user plane gateway 500 to the target user plane gateway 600, the control plane gateway 400 obtains an address of the terminal 300. The address of the terminal 300 may be an IP address or a MAC address of the terminal 300, or may be an IP address and a MAC address of the terminal 300. A manner in which the control plane gateway 400 obtains the address of the terminal 300 may be that the control plane gateway 400 obtains the address from a context of the terminal 300 that is stored in the control plane gateway 400. Alternatively, the control plane gateway 400 obtains the address from the source user plane gateway 500, or the control plane gateway 400 obtains the address from signaling of the terminal 300, or the like.

The control plane gateway 400 sends the obtained address of the terminal 300 to the target user plane gateway 600. When the target user plane gateway 600 obtains the address of the terminal 300 that is sent by the control plane gateway 400, the target user plane gateway 600 obtains, based on the address of the terminal 300, uplink data sent by the terminal 300. The uplink data carries the MAC address of the terminal 300.

The target user plane gateway 600 sends, to an Ethernet interface communicating with the switch 700, the uplink data sent by the terminal 300, and the switch 700 obtains, from the Ethernet interface, the uplink data sent by the terminal 300. The switch 700 updates the MAC address table in the switch 700 by obtaining the MAC address of the terminal 300 in the uplink data and a port communicating with the target user plane gateway. In addition, the switch 700 may further determine, based on the MAC address of the terminal 300 that is carried in the uplink data and a port address corresponding to the switch 700, whether the MAC address table in the switch 700 is updated, and update the MAC address table if the MAC address table is not updated. In this way, in this embodiment of the present application, the MAC address table in the switch 700 is updated in a timely manner, and when the user plane gateway communicating with the terminal 300 changes, the switch 700 may switch, in a timely manner based on an updated MAC address table, a communications port for sending data to the terminal 300, in order to ensure that the downlink data to be sent to the terminal 300 is not lost.

In addition, the target user plane gateway 600 may further obtain an ARP packet, and the ARP packet carries the IP address and the MAC address of the terminal 300. The target user plane gateway 600 sends the ARP packet to the switch 700 through the Ethernet interface, and the switch 700 updates the address list based on the ARP packet and a corresponding communications port address.

A manner in which the target user plane gateway 600 obtains the ARP packet may include but is not limited to the following.

In a first manner, the control plane gateway 400 sends a MAC address update indication to the terminal 300, and the terminal 300 generates, based on the received MAC address update indication, an Address Resolution Protocol (ARP) packet including the MAC address of the terminal 300. The ARP packet may be a gratuitous ARP packet. The terminal 300 sends the ARP packet to the target user plane gateway 600, and the target user plane gateway 600 receives the ARP packet sent by the terminal 300. The target user plane gateway 600 parses a received ARP packet, and determines, as the ARP packet sent by the terminal 300, an ARP packet that matches the MAC address of the terminal 300 in received APR packets.

In a second manner, the target user plane gateway 600 sends an ARP request including the address of the terminal 300 to the terminal 300, and the ARP request is used to request to use a broadcast MAC address as a source MAC address of an ARP request. When the terminal 300 receives the ARP request sent by the target user plane gateway 600, the terminal 300 sends an ARP response packet to the target user plane gateway 600, and the target user plane gateway 600 receives the ARP response packet sent by the terminal 300. A destination MAC address of the terminal 300 that is carried in the ARP response packet is the source MAC address of the ARP request. The ARP response packet is the ARP packet sent by the terminal 300. The target user plane gateway 600 forwards the ARP packet to the switch 700, and the switch 700 updates the MAC address table based on the received ARP packet.

In a third manner, the target user plane gateway 600 generates an ARP packet carrying the address of the terminal 300, and forwards the ARP packet to the switch 700. The switch 700 updates the MAC address table based on the received ARP packet.

With reference to FIG. 1B, first downlink data that is sent by the switch 700 to the source user plane gateway 500 before the switch 700 updates the MAC address table is forwarded to the target user plane gateway 600, such that the target user plane gateway 600 can send the first downlink data to the terminal 300 in a timely manner, to avoid a loss of the first downlink data. With reference to the foregoing embodiments, in another embodiment provided in the present application, a unidirectional temporary transmission tunnel is established between the source user plane gateway 500 and the target user plane gateway 600, and data can be sent only from the source user plane gateway 500 to the target user plane gateway 600. The unidirectional temporary transmission tunnel may be pre-established, or may be established at any time as required. This is not limited in this embodiment of the present application.

It should be noted that the unidirectional temporary transmission tunnel is established when the MAC address table in the switch 700 is updated. When the control plane gateway 400 switches the user plane gateway communicating with the terminal 300 from the source user plane gateway 500 to the target user plane gateway 600, the unidirectional temporary transmission tunnel is used to temporarily transmit downlink data in the source user plane gateway 500 that needs to be sent to the terminal 300. In this case, the source user plane gateway 500 sends the downlink data to the target user plane gateway 600 through the established unidirectional temporary transmission tunnel. After the target user plane gateway 600 receives the downlink data, the target user plane gateway 600 sends the downlink data to the terminal 300, to avoid a loss of the downlink data that is caused because when the control plane gateway 400 switches the user plane gateway communicating with the terminal 300, the switch 700 fails to update the address table in a timely manner, and the switch still sends the downlink data to the source user plane gateway 500.

Figure 2:
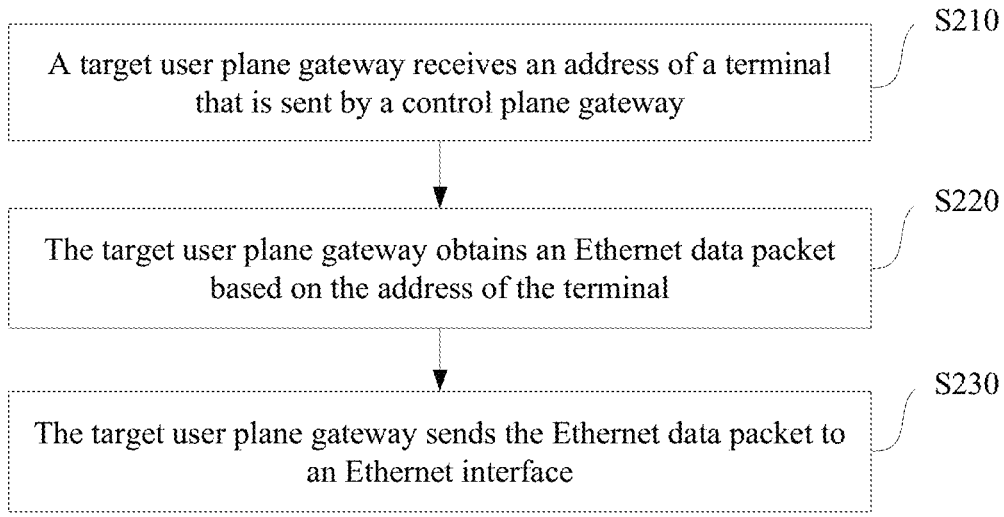
FIG. 2 is a flowchart of a data migration method according to another embodiment of the present application.

In another embodiment provided in the present application, a data migration method is further provided. The method is applied to a scenario in which a user plane gateway communicating with a terminal is changed from a source user plane gateway to a target user plane gateway. As shown in FIG. 2, an execution procedure on a target user plane gateway side includes the following steps.

In step S210, the target user plane gateway receives an address of the terminal that is sent by a control plane gateway.

The address of the terminal may be an IP address of the terminal, or a MAC address of the terminal, or an IP address and a MAC address of the terminal.

In step S220, the target user plane gateway obtains an Ethernet data packet based on the address of the terminal.

The Ethernet data packet includes uplink data sent by the terminal or an ARP packet. The APR packet may be an ARP packet sent by the terminal that is received by the target user plane gateway and that includes the address of the terminal, or an ARP packet that is generated by the target user plane gateway and that includes the address of the terminal. In addition, the target user plane gateway may alternatively receive uplink data sent by the terminal that includes the address of the terminal.

The target user plane gateway parses received uplink data, and determines, based on the uplink data sent by the terminal, uplink data including the address of the terminal. The target user plane gateway determines, based on the ARP packet sent by the terminal, an ARP packet that includes the address of the terminal in received ARP packets.

The target user plane gateway determines, based on the uplink data sent by the terminal, the uplink data including the address of the terminal. In addition, the target user plane gateway may obtain the APR packet in the foregoing three ARP packet obtaining manners, and details are not described herein. For details, refer to the foregoing embodiment.

It should be noted that the embodiments provided in the present application may be correlatively combined and mutually explained.

In step S230, the target user plane gateway sends the Ethernet data packet to an Ethernet interface.

The target user plane gateway obtains the Ethernet data packet based on the address of the terminal. In some embodiments, the target user plane gateway may receive the uplink data sent by the terminal that includes the address of the terminal, or receive the ARP packet sent by the terminal that includes the address of the terminal. In addition, the target user plane gateway may alternatively generate the ARP packet including the address of the terminal. In this way, when obtaining, through the Ethernet interface, the ARP packet that is sent by the target user plane gateway and that includes the address of the terminal, or the uplink data that is sent by the target user plane gateway and that includes the address of the terminal, an Ethernet switch can update a MAC address table in a timely manner, and forward downlink data for the terminal to the target user plane gateway based on an updated MAC address table, to avoid a data loss.

The target user plane gateway is located in an evolved packet system (EPS), and the Ethernet interface is an SGi interface; or the target user plane gateway is located in a NexGen system, and the Ethernet interface is an NG6 interface.

Figure 3:
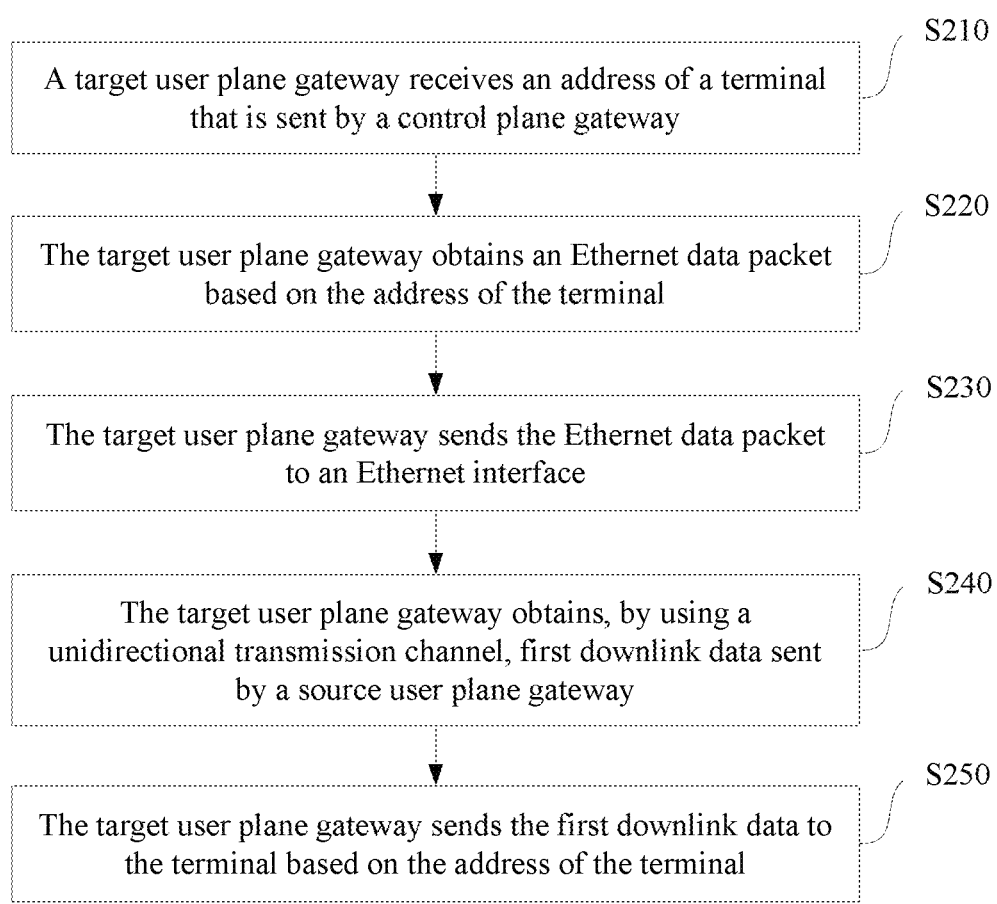
FIG. 3 is a flowchart of a data migration method according to another embodiment of the present application.

For details of the method in FIG. 2, in another embodiment provided in the present application, as shown in FIG. 3, the method may further include the following steps.

In step S240, the target user plane gateway obtains, using a unidirectional transmission channel, first downlink data sent by the source user plane gateway.

The transmission channel is a unidirectional temporary transmission tunnel established between the source user plane gateway and the target user plane gateway.

In step S250, the target user plane gateway sends the first downlink data to the terminal based on the address of the terminal.

Referring to FIG. 1B, a transmission tunnel used for unidirectional temporary data transmission is established between the source user plane gateway 500 and the target user plane gateway 600. Downlink data in the source user plane gateway 500 that needs to be sent to the terminal 300 is sent to the target user plane gateway 600 through the unidirectional temporary transmission tunnel. After the target user plane gateway receives the downlink data, the target user plane gateway sends the downlink data to the terminal 300, to avoid a problem such as a loss or a sending latency of the downlink data to be sent to the terminal 300 that is caused because the MAC address table in the switch fails to be updated in a timely manner. The first downlink data includes the address of the terminal 300.

Figure 4:
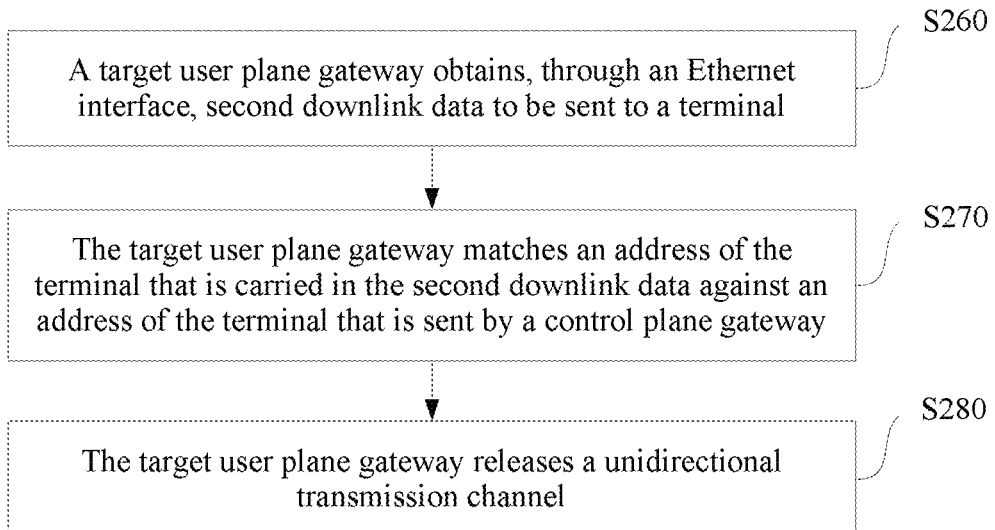
FIG. 4 is a flowchart of a data migration method according to another embodiment of the present application.

For details of the method in FIG. 3, in another embodiment provided in the present application, as shown in FIG. 4, the method may further include the following steps.

In step S260, the target user plane gateway obtains, through the Ethernet interface, second downlink data to be sent to the terminal.

The second downlink data carries an address of the terminal.

In step S270, the target user plane gateway matches an address of the terminal that is carried in the second downlink data against the address of the terminal that is sent by the control plane gateway.

In step S280, the target user plane gateway releases the unidirectional transmission channel if the address of the terminal that is carried in the second downlink data successfully matches the address of the terminal that is sent by the control plane gateway.

When the address of the terminal that is carried in the second downlink data matches the address of the terminal that is sent by the control plane gateway, it may be determined that the MAC address table in the switch has been updated. In this case, the target user plane gateway may release the transmission channel between the source user plane gateway and the target user plane gateway.

In this embodiment, the target user plane gateway mainly determines, by obtaining the second downlink data to be sent to the terminal, and matching the address of the terminal that is carried in the second downlink data against the address of the terminal that is obtained from the control plane gateway, whether the MAC address table in the switch is updated. If it is determined that the MAC address table in the switch is not updated, the switch still sends downlink data to the source user plane gateway based on an address in the MAC address table that is not updated. In this case, the source user plane gateway may send, to the target user plane gateway through the established unidirectional temporary transmission tunnel, the downlink data sent by the switch. After receiving the downlink data, the target user plane gateway sends the downlink data to the terminal, to avoid a data loss.

When the target user plane gateway determines, in the foregoing manner, that the MAC address table in the switch has been updated, it indicates that the switch can correctly send, to the target user plane gateway based on an updated MAC address table, downlink data to be sent to the terminal. In this case, the downlink data does not need to be transmitted through the established unidirectional temporary transmission tunnel, and then the target user plane gateway may release the unidirectional temporary transmission tunnel, or initiate an execution procedure of releasing the unidirectional temporary transmission tunnel.

Figure 5:
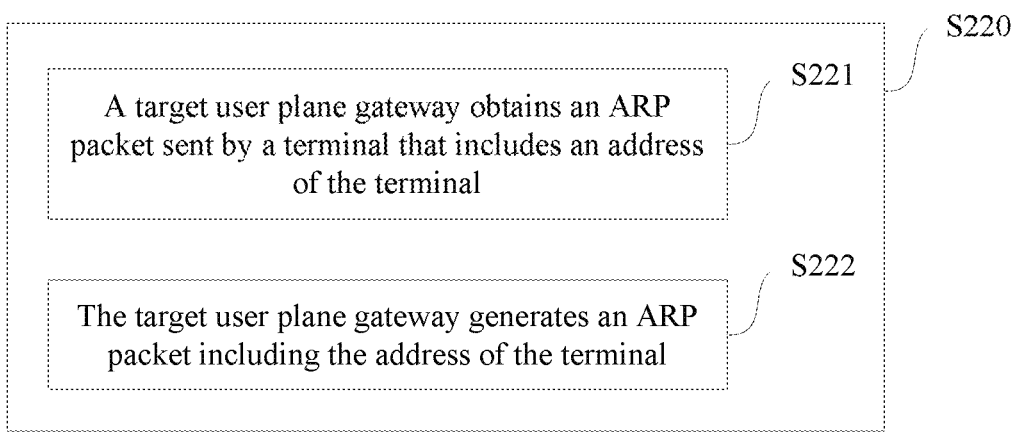
FIG. 5 is a flowchart of step S220 according to an embodiment of the present application.

For details of the method in FIG. 2, in another embodiment provided in the present application, as shown in FIG. 5, step S220 may further include the following steps.

In step S221, the target user plane gateway obtains an ARP packet sent by the terminal that includes the address of the terminal.

The target user plane gateway parses a received ARP packet to obtain an address, and when the ARP packet includes the address of the terminal, determines the received packet as the ARP packet sent by the terminal.

Alternatively, in step S222, the target user plane gateway generates an ARP packet including the address of the terminal.

That the target user plane gateway obtains the ARP packet sent by the terminal or generates the ARP packet is described in detail in the foregoing embodiment, and details are not described herein again.

Figure 6:
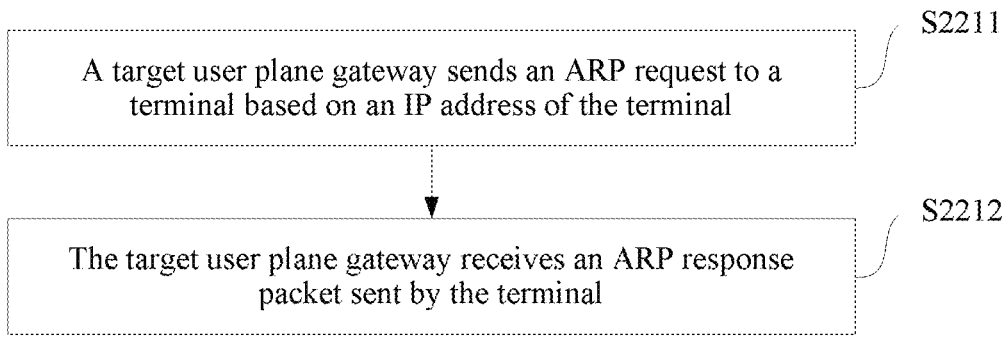
FIG. 6 is a flowchart of step S221 according to an embodiment of the present application.

For details of the method in FIG. 5, in another embodiment provided in the present application, as shown in FIG. 6, the address of the terminal is the IP address, and step S221 may further include the following steps.

In step S2211, the target user plane gateway sends an ARP request message to the terminal based on the IP address of the terminal.

A source MAC address of the ARP request message is a broadcast MAC address. The APR request carries the IP address of the terminal.

In step S2212, the target user plane gateway receives the ARP packet sent by the terminal.

The target user plane gateway receives an ARP response packet sent by the terminal, the ARP response packet includes the IP address of the terminal and the source MAC address, and the source MAC address is the broadcast MAC address. The target user plane gateway parses an ARP packet, and determines an APR packet including the address of the terminal as the ARP packet sent by the terminal.

For details, refer to a detailed description in the foregoing embodiment. Details are not described herein again.

Figure 7:
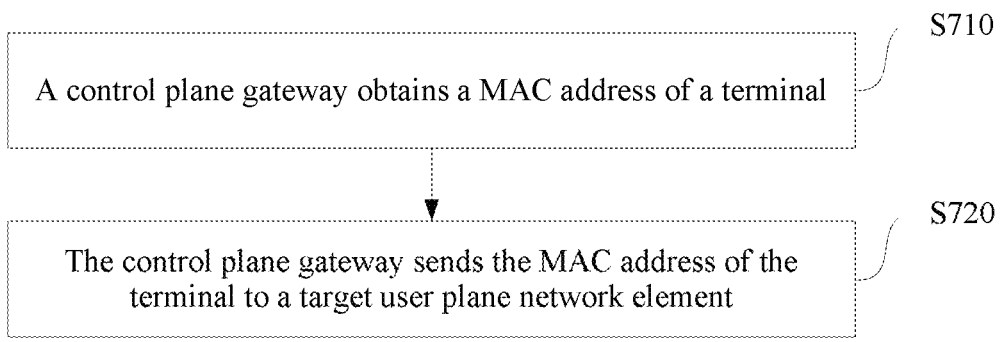
FIG. 7 is a flowchart of a data migration method according to another embodiment of the present application.

In another embodiment provided in the present application, as shown in FIG. 7, a data migration method is provided. The method is applied to a scenario in which a user plane gateway communicating with a terminal is changed from a source user plane gateway to a target user plane gateway, and the method includes the following steps.

In step S710, a control plane gateway obtains a MAC address of the terminal.

In step S720, the control plane gateway sends the MAC address of the terminal to the target user plane gateway.

A manner in which the control plane gateway obtains the address of the terminal may be that the control plane gateway obtains the address from a context of the terminal that is stored in the control plane gateway, or the target user plane gateway obtains the address from the source user plane gateway, or the target user plane gateway obtains the address from signaling used for communication with the terminal, or the like.

Based on the foregoing descriptions of the method embodiments, a person skilled in the art may clearly understand that the present application may be implemented by software in addition to a universal hardware platform or by hardware only. In most circumstances, the former is a better implementation. Based on such an understanding, the technical solutions of the present application essentially, or the part contributing to other approaches may be implemented in a form of a software product. The software product is stored in a storage medium, and includes several instructions for instructing a computer device (which may be a personal computer, a server, a network device, or the like) to perform all or some of the steps of the methods described in the embodiments of the present application. The foregoing storage medium includes any medium that can store program code, such as a read-only memory (ROM), a random-access memory (RAM), a magnetic disk, or an optical disc.

To describe implementation processes of the foregoing embodiments in detail, the following embodiments provided in the present application are respectively corresponding to the foregoing embodiments. It should be noted that the embodiments provided in the present application may be mutually explained, mutually supplemented, and mutually combined.

Figure 8:
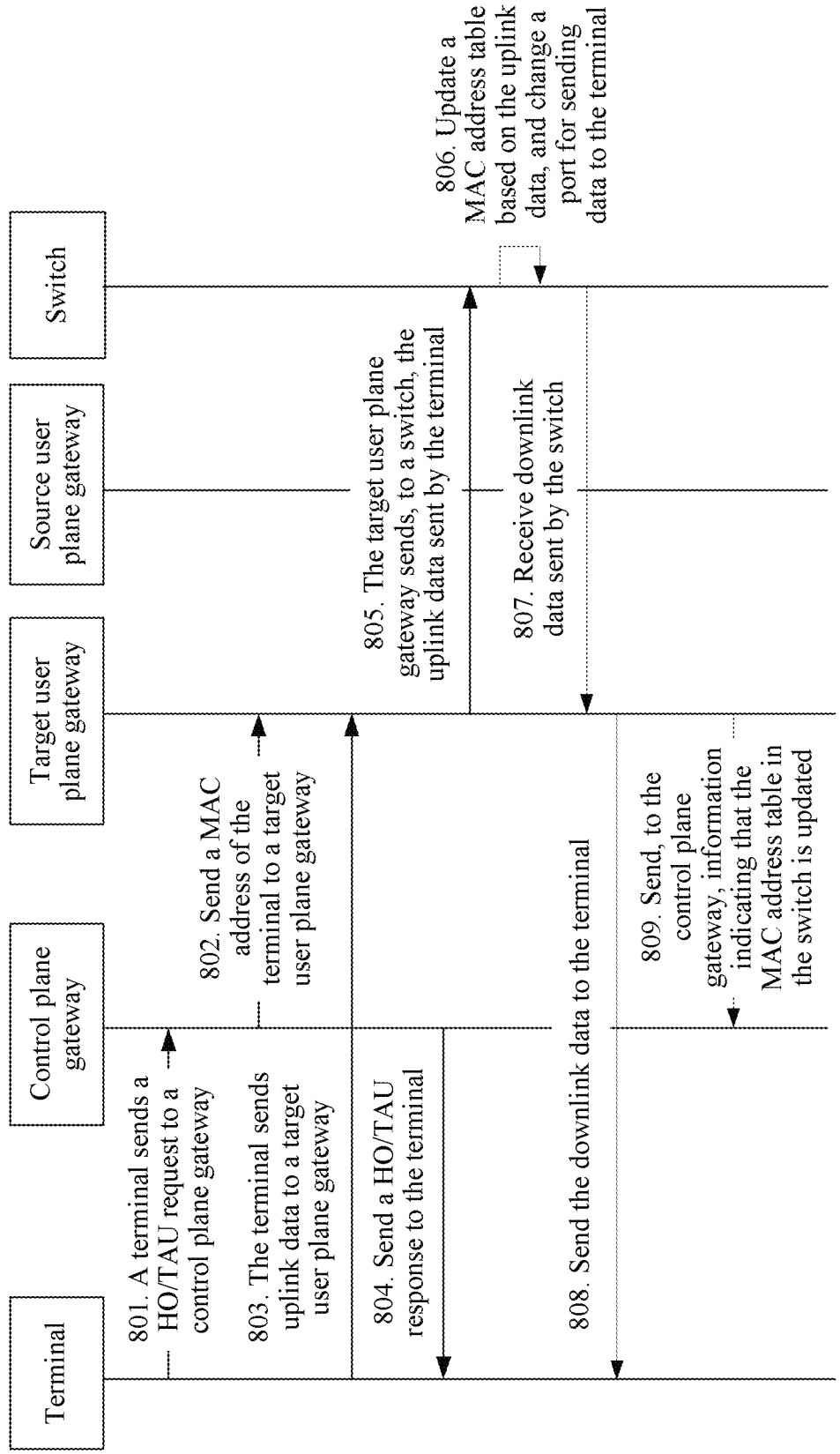
FIG. 8 is a signaling flowchart of a data migration method according to another embodiment of the present application.

To describe in detail a process in which the target user plane gateway 600 sends, to the switch 700, uplink data sent by the terminal, such that the switch 700 can update a MAC address table in a timely manner based on the uplink data, in an embodiment provided in the present application, as shown in FIG. 8, a data migration method is provided, and includes the following steps.

In step 801, a terminal sends a Handover/Handoff (HO)/tracking area update (TAU) request to a control plane gateway.

In step 802, when receiving the HO/TAU request sent by the terminal, the control plane gateway sends a MAC address of the terminal to a target user plane gateway.

The control plane gateway sends the MAC address of the terminal to the target user plane gateway in a packet data network (PDN) session.

In step 803, the terminal sends, to the target user plane gateway, uplink data including an address of the terminal.

In step 804, the control plane gateway sends a HO/TAU response to the terminal.

In step 805, the target user plane gateway sends, to a switch, the received uplink data sent by the terminal.

In step 806, the switch updates a MAC address table based on the uplink data sent by the target user plane gateway, and changes a port for sending data to the terminal.

In step 807, the target user plane gateway receives downlink data for the terminal that is sent by the switch.

In step 808, the target user plane gateway sends the downlink data to the terminal, where the downlink data includes the address of the terminal.

In step 809, the target user plane gateway sends, to the control plane gateway, information indicating that the MAC address table in the switch is updated.

According to the data migration method provided in this embodiment of the present application, the target user plane gateway obtains, based on the address of the terminal, the uplink data sent by the terminal, where the uplink data includes the address of the terminal, and the target user plane gateway sends the uplink data to an Ethernet interface, such that the switch obtains the uplink data through the Ethernet interface, and updates the MAC address table based on the uplink data. In this way, the switch updates the MAC address table in a timely manner, and the switch can send, through a correct port based on an updated MAC address table, downlink data that needs to be sent to the terminal, to effectively prevent a loss of the downlink data to be sent to the terminal.

Figure 9:
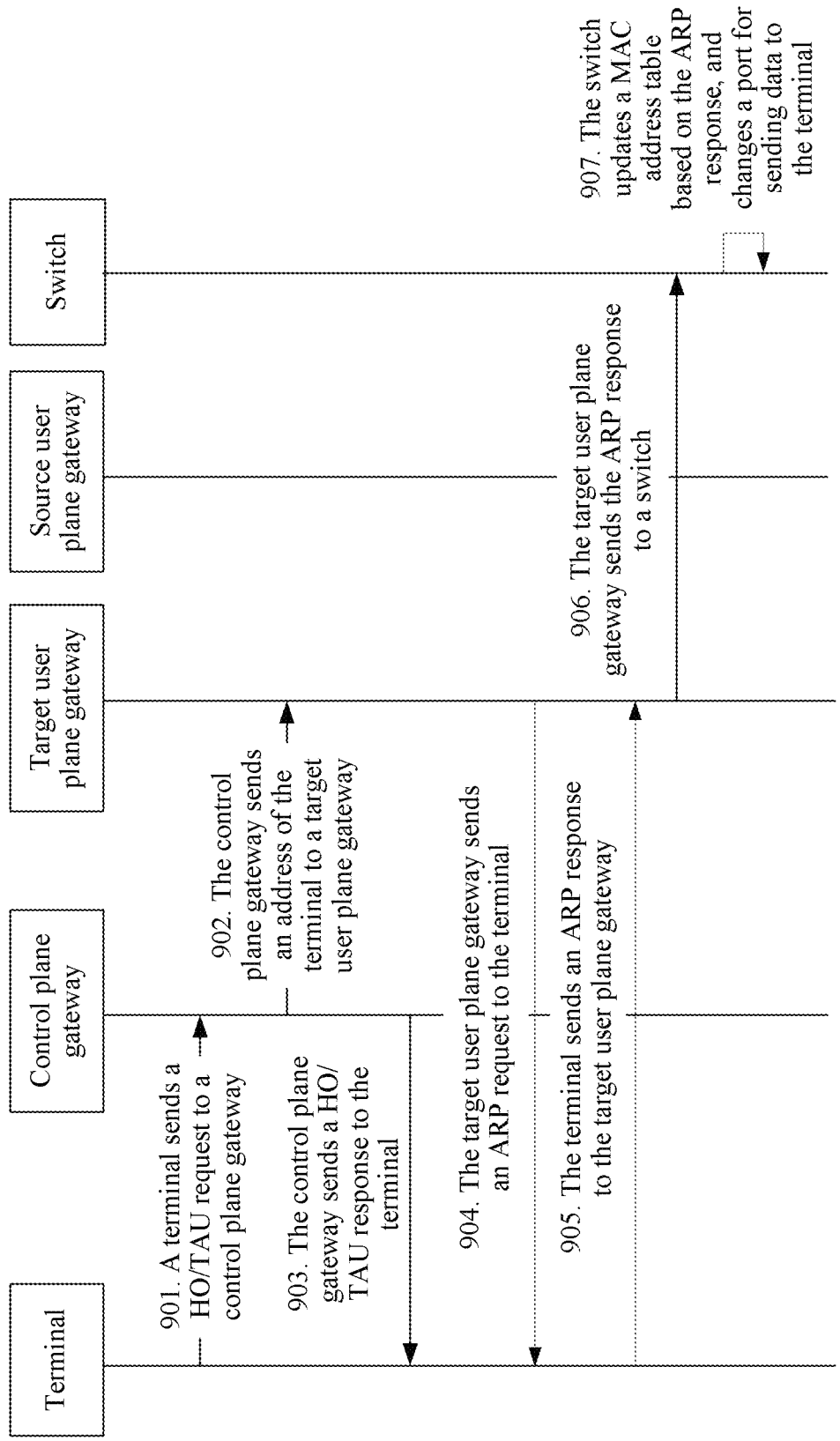
FIG. 9 is a signaling flowchart of a data migration method according to another embodiment of the present application.

To describe in detail a process in which the target user plane gateway 600 sends an ARP packet request to the terminal 300, and the target user plane gateway 600 sends, to the switch 700, an ARP response packet received from the terminal 300, such that the switch 700 updates a MAC address table based on the ARP response packet, in an embodiment provided in the present application, as shown in FIG. 9, a data migration method is provided, and includes the following steps.

In step 901, a terminal sends a HO/TAU request to a control plane gateway.

In step 902, the control plane gateway sends an address of the terminal to a target user plane gateway in a PDN session.

In step 903, the control plane gateway sends a HO/TAU response to the terminal.

In step 904, the target user plane gateway sends an ARP request to the terminal, where the ARP request carries an IP address of the terminal.

In step 905, the terminal sends an ARP response to the target user plane gateway, where the ARP response includes the IP address and a MAC address of the terminal.

In step 906, the target user plane gateway sends the ARP response to a switch.

In step 907, the switch updates a MAC address table based on the ARP response, and changes a port for sending data to the terminal.

According to the data migration method provided in this embodiment of the present application, the target user plane gateway obtains, based on the address of the terminal, an ARP packet sent by the terminal, where the ARP packet includes the address of the terminal, and the target user plane gateway sends the ARP packet to an Ethernet interface, such that the switch obtains the ARP packet through the Ethernet interface, and updates the MAC address table based on the ARP packet. In this way, the switch updates the MAC address table in a timely manner, and the switch can send, through a correct port based on an updated MAC address table, downlink data that needs to be sent to the terminal, to effectively prevent a loss of the downlink data to be sent to the terminal.

Figure 10:
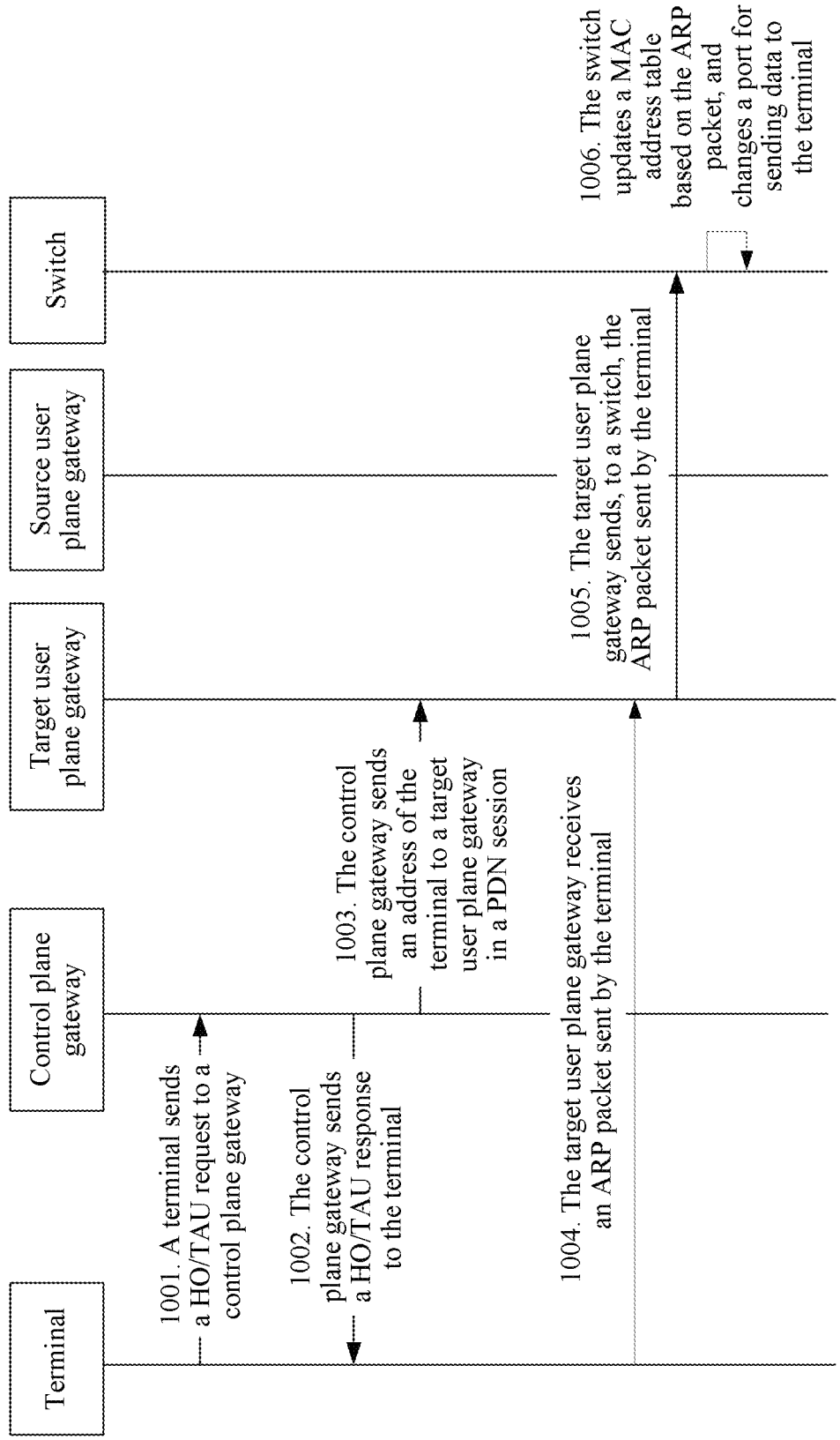
FIG. 10 is a signaling flowchart of a data migration method according to another embodiment of the present application.

To describe in detail a process in which the target user plane gateway 600 sends a gratuitous ARP packet generated by the terminal 300 to the switch 700, such that the switch 700 updates a MAC address table based on the gratuitous ARP packet, in an embodiment provided in the present application, as shown in FIG. 10, a data migration method is provided, and includes the following steps.

In step 1001, a terminal sends a HO/TAU request to a control plane gateway.

In step 1002, the control plane gateway sends a HO/TAU response to the terminal.

In step 1003, the control plane gateway sends an address of the terminal to a target user plane gateway in a PDN session.

The address of the terminal includes an IP address and a MAC address of the terminal.

In step 1004, the terminal sends an ARP packet to the target user plane gateway.

The ARP packet carries the address of the terminal, and the ARP packet is a gratuitous ARP packet.

In step 1005, the target user plane gateway sends, to a switch, the ARP packet sent by the terminal.

In step 1006, the switch updates a MAC address table based on the ARP packet, and changes a port for sending data to the terminal.

According to the data migration method provided in this embodiment of the present application, the target user plane gateway obtains, based on the address of the terminal, the ARP packet sent by the terminal, where the ARP packet includes the address of the terminal, and the target user plane gateway sends the ARP packet to an Ethernet interface, such that the switch obtains the ARP packet through the Ethernet interface, and updates the MAC address table based on the ARP packet. In this way, the switch updates the MAC address table in a timely manner, and the switch can send, through a correct port based on an updated MAC address table, downlink data that needs to be sent to the terminal, to effectively prevent a loss of the downlink data to be sent to the terminal.

Figure 11:
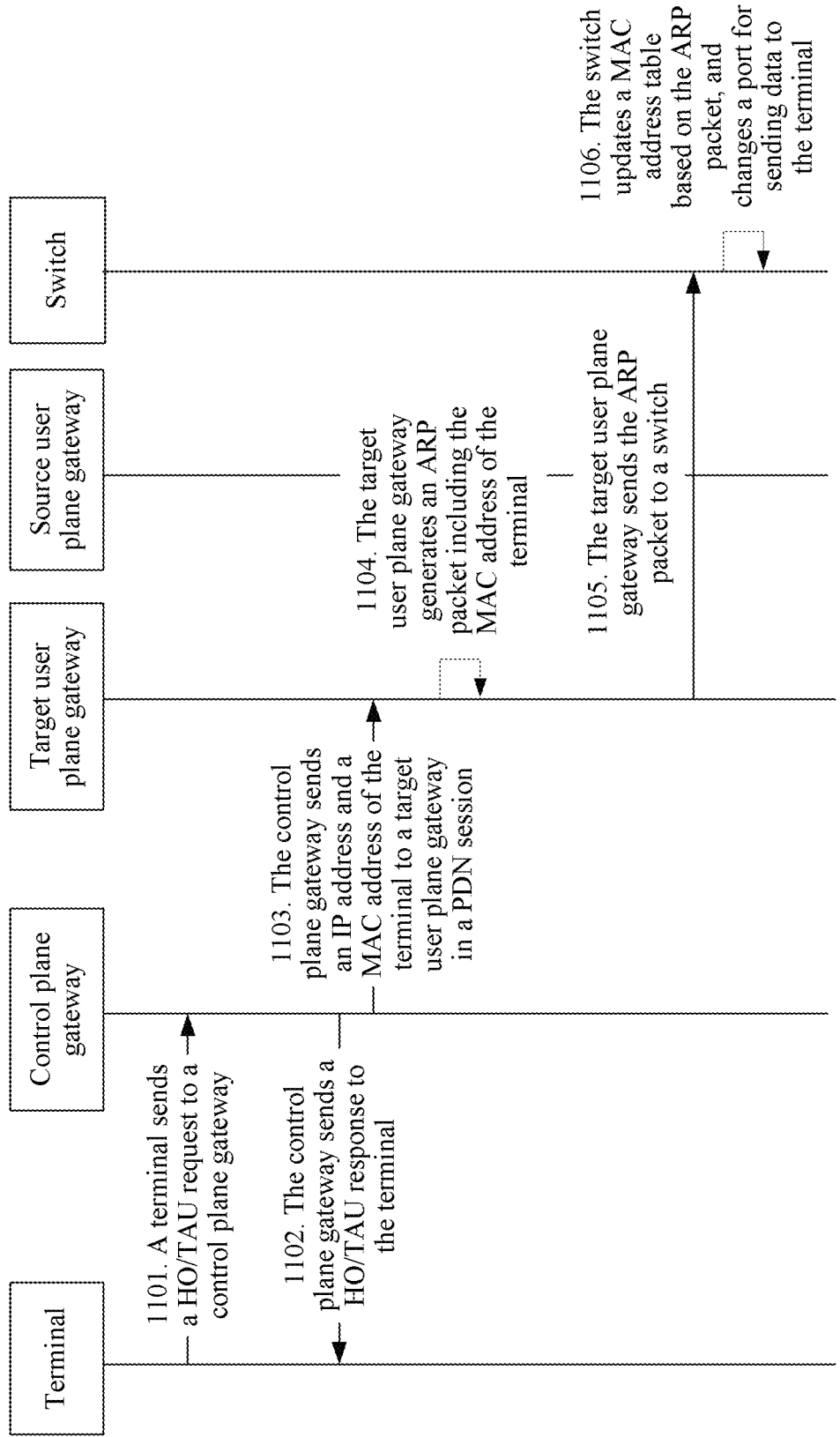
FIG. 11 is a signaling flowchart of a data migration method according to another embodiment of the present application.

To describe in detail a process in which the target user plane gateway 600 generates an ARP packet, and sends the ARP packet to the switch 700, such that the switch 700 updates a MAC address table based on the ARP packet, in an embodiment provided in the present application, as shown in FIG. 11, a data migration method is provided, and includes the following steps.

In step 1101, a terminal sends a HO/TAU request to a control plane gateway.

In step 1102, the control plane gateway sends a HO/TAU response to the terminal.

In step 1103, the control plane gateway sends an IP address and a MAC address of the terminal to the target user plane gateway in a PDN session.

In step 1104, the target user plane gateway generates an ARP packet including the MAC address of the terminal.

In step 1105, the target user plane gateway sends the ARP packet to a switch.

In step 1106, the switch updates a MAC address table based on the ARP packet, and changes a port for sending data to the terminal.

According to the data migration method provided in this embodiment of the present application, the target user plane gateway generates, based on the address of the terminal, the ARP packet including the address of the terminal, and the target user plane gateway sends the ARP packet to an Ethernet interface, such that the switch obtains the ARP packet through the Ethernet interface, and updates the MAC address table based on the ARP packet. In this way, the switch updates the MAC address table in a timely manner, and the switch can send, through a correct port based on an updated MAC address table, downlink data that needs to be sent to the terminal, to effectively prevent a loss of the downlink data to be sent to the terminal.

Figure 12:
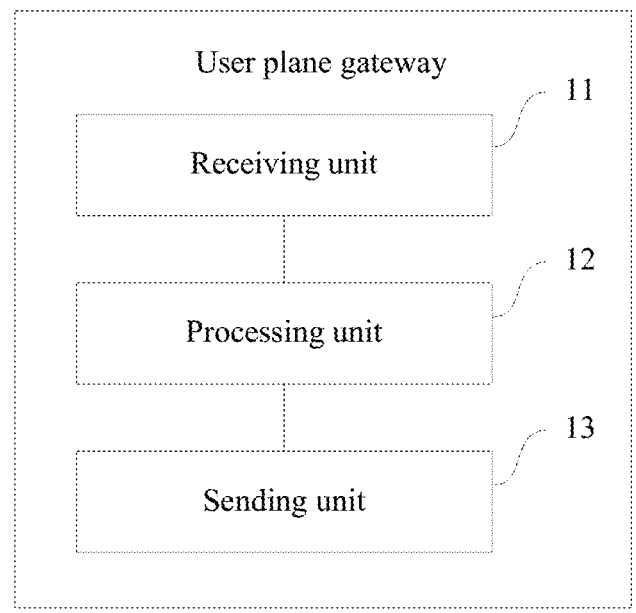
FIG. 12 is a schematic structural diagram of a user plane gateway according to an embodiment of the present application.

In addition, in an implementation of the foregoing embodiments, an embodiment of the present application further provides a user plane gateway, applied to a scenario in which a user plane gateway communicating with a terminal is changed from a source user plane gateway to the user plane gateway. The user plane gateway may be configured to perform an action performed by the target user plane gateway in the embodiment shown in any one of FIG. 2 to FIG. 11. As shown in FIG. 12, the user plane gateway includes: a receiving unit 11 configured to receive an address of the terminal that is sent by a control plane gateway; a processing unit 12 configured to obtain an Ethernet data packet based on the address of the terminal that is received by the receiving unit 11, where the Ethernet data packet includes uplink data sent by the terminal or an Address Resolution Protocol (ARP) packet; and a sending unit 13 configured to send the Ethernet data packet obtained by the processing unit 12 to an Ethernet interface, such that a switch obtains the Ethernet data packet through the Ethernet interface, and updates a MAC address table based on the Ethernet data packet.

In this way, the switch can obtain the ARP packet or the uplink data through the Ethernet interface, update the MAC address table based on the ARP packet or the uplink data, and change a port for sending data to the terminal, to avoid a loss of downlink data to be sent to the terminal.

In another embodiment provided in the present application, the receiving unit 11 is further configured to obtain, using a unidirectional transmission channel, first downlink data sent by the source user plane gateway, where the unidirectional transmission channel is a unidirectional temporary transmission tunnel established between the source user plane gateway and the target user plane gateway. Additionally, the sending unit 13 is further configured to send the first downlink data to the terminal based on the address of the terminal that is received by the receiving unit 11.

In this way, a problem—such as a loss or a sending latency of the downlink data to be sent to the terminal that is caused because the MAC address table in the switch fails to be updated in a timely manner—can be avoided.

In another embodiment provided in the present application, the receiving unit 11 is further configured to obtain, through the Ethernet interface, second downlink data to be sent to the terminal, where the second downlink data carries an address of the terminal. Additionally, the processing unit 12 is further configured to release, by the target user plane gateway, the unidirectional transmission channel if the address of the terminal that is carried in the second downlink data received by the receiving unit 11 successfully matches the address of the terminal that is sent by the control plane gateway.

When the address of the terminal that is carried in the second downlink data matches the address of the terminal that is sent by the control plane gateway, it may be determined that the MAC address table in the switch has been updated. In this case, the target user plane gateway may release the transmission channel between the source user plane gateway and the target user plane gateway.

In another embodiment provided in the present application, the address of the terminal includes at least one of an IP address of the terminal or a MAC address of the terminal.

In another embodiment provided in the present application, the receiving unit 11 is further configured to obtain, based on the address of the terminal, an ARP packet sent by the terminal; or the processing unit 12 is further configured to generate an ARP packet including the address of the terminal.

In another embodiment provided in the present application, the address of the terminal is the IP address.

The sending unit 13 is further configured to send an ARP request message to the terminal, where the ARP request message includes the IP address of the terminal and a source MAC address, and the source MAC address is a broadcast MAC address.

The receiving unit 11 is further configured to receive the ARP packet sent by the terminal, where the ARP packet carries a destination MAC address of the terminal, and the destination MAC address is the source MAC address included in the ARP request message.

In another embodiment provided in the present application, the receiving unit 11 is further configured to receive a gratuitous ARP packet sent by the terminal. If the gratuitous ARP packet carries the address of the terminal, the gratuitous APR packet is the ARP packet sent by the terminal.

In another embodiment provided in the present application, the target user plane gateway is located in an EPS, and the Ethernet interface is an SGi interface; or the target user plane gateway is located in a NexGen system, and the Ethernet interface is an NG6 interface.

Figure 13:
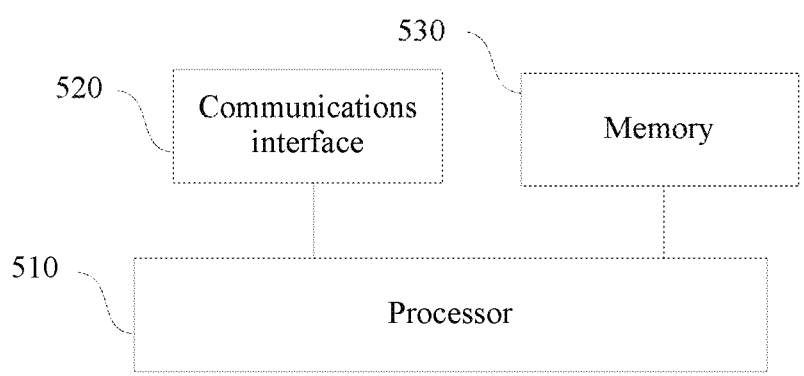
FIG. 13 is a schematic diagram of a data migration apparatus according to an embodiment of the present application.

In an optional embodiment, the processing unit 12 may be a processor 510, and the receiving unit 11 and the sending unit 13 may be a communications interface 520. In addition, the user plane gateway may further include a memory 530. The memory 530 is configured to store program code and data of the user plane gateway. In some embodiments, as shown in FIG. 13, the user plane gateway includes the processor 510, the communications interface 520, and the memory 530.

Figure 14:
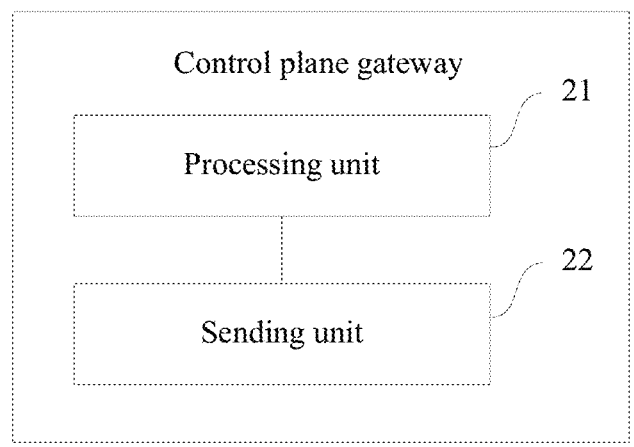
FIG. 14 is a schematic structural diagram of a control plane gateway according to an embodiment of the present application.

In an implementation of the foregoing embodiments, an embodiment of the present application further provides a control plane gateway. When the control plane gateway switches a user plane gateway communicating with a terminal from a source user plane gateway to a target user plane gateway, the control plane gateway may be configured to perform an action performed by the control plane gateway in the foregoing method embodiments. As shown in FIG. 14, the control plane gateway includes: a processing unit 21 configured to obtain a MAC address of the terminal; and a sending unit 22 configured to send, to the target user plane gateway, the MAC address of the terminal that is obtained by the processing unit 21.

In an optional embodiment, the sending unit 22 may be a communications interface 520. In addition, the control plane gateway may further include a memory 530. The memory 530 is configured to store program code and data of the control plane gateway. As shown in FIG. 13, the control plane gateway includes a processor 510, the communications interface 520, and the memory 530.

It may be understood that the present application may be applied to environments or configurations of a plurality of universal or dedicated computing systems, for example, a personal computer, a server computer, a handheld device or a portable device, a flat panel device, a multi-processor system, a microprocessor-based system, a set-top box, a programmable consuming electronic device, a network personal computer (PC), a minicomputer, a mainframe computer, and a distributed computing environment including any one of the foregoing systems or devices.

The present application can be described in the general context of computer-executable instructions executed by a computer, for example, a program module. Generally, the program module includes a routine, a program, an object, a component, a data structure, and the like for executing a particular task or implementing a particular data type. The present application may also be practiced in distributed computing environments in which tasks are performed by remote processing devices that are connected through a communications network. In a distributed computing environment, program modules may be located in both local and remote computer storage media including storage devices.

It should be noted that in this specification, relational terms such as "first" and "second" are only used to distinguish one entity or operation from another, and do not necessarily require or imply that any actual relationship or sequence exists between these entities or operations. Moreover, the term "include", "comprise", or their any other variant is intended to cover a non-exclusive inclusion, such that a process, a method, an article, or a device that includes a list of elements not only includes those elements but also includes other elements that are not expressly listed, or further includes elements inherent to such a process, a method, an article, or a device. An element preceded by "includes a . . . " does not, without more constraints, preclude the presence of additional identical elements in the process, method, article, or device that includes the element.

A person skilled in the art can figure out another implementation solution according to the present application after considering the specification and practicing the present application disclosed herein. This application is intended to cover any variations, functions, or adaptive changes of the present application. These variations, functions, or adaptive changes comply with general principles of the present application, and include common knowledge or a commonly used technical means in the technical field that is not disclosed in the present application. The specification and the embodiments are merely considered as examples, and the scope and the spirit of the present application are pointed out by the following claims. It should be understood that the present application is not limited to the accurate structures that are described in the foregoing and that are shown in the accompanying drawings, and modifications and changes may be made without departing from the scope of the present application. The scope of the present application is limited only by the appended claims.

What is claimed is:

1. A method, comprising:
receiving, when a terminal changes from a source user plane gateway in a core network to a target user plane gateway, a medium access control (MAC) address of the terminal from a control plane gateway in the core network;
obtaining an Ethernet data packet comprising the MAC address; and
sending, through an Ethernet interface, the Ethernet data packet to a switch to update a MAC address table of the switch.

2. The method of claim 1, wherein the Ethernet data packet comprises an uplink data packet or an Address Resolution Protocol (ARP) packet.

3. The method of claim 2, wherein the ARP packet is a gratuitous ARP packet.

4. The method of claim 1, wherein the Ethernet data packet comprises an Address Resolution Protocol (ARP) packet, and wherein obtaining the Ethernet data packet comprises generating the ARP packet with the MAC address.

5. The method of claim 1, wherein the target user plane gateway is located in a next generation (NexGen) system, and wherein the Ethernet interface is an NG6 interface.

6. An apparatus, comprising:
one or more processors; and
a memory coupled to the one or more processors and configured to store instructions executable by the one or more processors such that when executed, the apparatus is configured to:
receive, when a terminal changes from a source user plane gateway in a core network to a target user plane gateway, a medium access control (MAC) address of the terminal from a control plane gateway in the core network;
obtain an Ethernet data packet comprising the MAC address; and
send, through an Ethernet interface, the Ethernet data packet to a switch to update a MAC address table of the switch.

7. The apparatus of claim 6, wherein the Ethernet data packet comprises an uplink data packet or an Address Resolution Protocol (ARP) packet.

8. The apparatus of claim 6, wherein the Ethernet data packet comprises an Address Resolution Protocol (ARP) packet, and wherein when the one or more processors execute the instructions, the apparatus is further configured to generate the ARP packet with the MAC address.

9. The apparatus of claim 6, wherein the apparatus is located in a next generation (NexGen) system, and wherein the Ethernet interface is an NG6 interface.

10. A computer program product comprising instructions stored on a non-transitory computer-readable medium that, when executed by one or more processors, to:
receive, when a terminal changes from a source user plane gateway in a core network to a target user plane gateway, a medium access control (MAC) address of the terminal from a control plane gateway in the core network;

obtain an Ethernet data packet comprising the MAC address; and send, through an Ethernet interface, the Ethernet data packet to a switch to update a MAC address table of the switch.

11. The computer program product of claim 10, wherein the Ethernet data packet comprises an uplink data packet.

12. The computer program product of claim 10, wherein the Ethernet data packet comprises an Address Resolution Protocol (ARP) packet.

13. The computer program product of claim 12, wherein the ARP packet is a gratuitous ARP packet.

14. The computer program product of claim 10, wherein the Ethernet data packet comprises an Address Resolution Protocol (ARP) packet, and wherein the one or more processors are further configured to execute the instructions to obtain the Ethernet data packet by generating the ARP packet with the MAC address.

15. The computer program product of claim 10, wherein the target user plane gateway is located in a next generation (NexGen) system, and wherein the Ethernet interface is an NG6 interface.

16. A core network, comprising:
a control plane gateway configured to send a Media Access Control (MAC) address of a terminal; and
a target user plane gateway configured to:
receive the MAC address of the terminal from the control plane gateway when the terminal changes from a source user plane gateway to the target user plane gateway;
obtain an Ethernet data packet comprising the MAC address; and
send, through an Ethernet interface, the Ethernet data packet to a switch to update a MAC address table of the switch.

17. The core network of claim 16, wherein the Ethernet data packet comprises an uplink data packet.

18. The core network of claim 16, wherein the Ethernet data packet comprises an Address Resolution Protocol (ARP) packet.

19. The core network of claim 16, wherein the Ethernet data packet comprises an Address Resolution Protocol (ARP) packet, and wherein the target user plane gateway is further configured to generate the ARP packet with the MAC address.

20. The core network of claim 16, wherein the target user plane gateway is located in a next generation (NexGen) system, and wherein the Ethernet interface is an NG6 interface.

* * * * *